(12) United States Patent
Dao

(10) Patent No.: US 7,828,113 B1
(45) Date of Patent: Nov. 9, 2010

(54) METHODS AND APPARATUS FOR CONTROLLING VIBRATION OF ENCLOSURES, PARTICULARLY LOUDSPEAKER ENCLOSURES

(76) Inventor: Kim Dao, 3056 Scott Blvd., Ste C, Santa Clara, CA (US) 95054

( * ) Notice: Subject to any disclaimer, the term of this patent is extended or adjusted under 35 U.S.C. 154(b) by 7 days.

(21) Appl. No.: 11/732,231

(22) Filed: Apr. 2, 2007

(51) Int. Cl.
F16F 7/08 (2006.01)
F16F 15/02 (2006.01)
F16F 7/00 (2006.01)
F16F 15/00 (2006.01)

(52) U.S. Cl. ....................... 181/208; 181/207
(58) Field of Classification Search ............... 181/208, 181/209, 207, 199, 151
See application file for complete search history.

(56) References Cited

U.S. PATENT DOCUMENTS

| | | | | |
|---|---|---|---|---|
| 2,285,924 A * | 6/1942 | Halfvarson | ............... | 181/208 |
| 2,424,004 A * | 7/1947 | Kern | ..................... | 181/208 |
| 2,724,454 A * | 11/1955 | Rowe | ..................... | 181/208 |
| 2,764,136 A * | 9/1956 | Gadd | ..................... | 184/106 |
| 3,107,905 A * | 10/1963 | Lucas | ..................... | 267/161 |
| 3,273,670 A * | 9/1966 | Kleinlein | ............... | 188/381 |
| 3,966,026 A * | 6/1976 | Fillderman | ........... | 188/73.37 |
| 4,232,762 A * | 11/1980 | Bschorr | ................. | 188/268 |
| 4,289,929 A | 9/1981 | Hathaway | | |
| 4,355,578 A * | 10/1982 | Raquet | ................. | 104/306 |
| 4,373,608 A * | 2/1983 | Holmes | ................. | 181/202 |
| 4,392,681 A * | 7/1983 | Raquet | ..................... | 295/7 |
| 4,516,658 A * | 5/1985 | Scarton et al. | ............... | 181/208 |
| 4,765,436 A * | 8/1988 | Dowell | ..................... | 181/207 |
| 5,240,221 A * | 8/1993 | Thomasen | ............... | 248/559 |
| 5,339,652 A * | 8/1994 | Dreiman | ................. | 181/403 |
| 5,528,005 A * | 6/1996 | Bschorr et al. | ............ | 181/208 |
| 5,550,335 A * | 8/1996 | Ermert et al. | ............... | 181/207 |
| 5,583,324 A | 12/1996 | Thomasen | | |
| 5,629,503 A * | 5/1997 | Thomasen | ............... | 181/199 |
| 5,691,516 A * | 11/1997 | Thomasen | ............... | 181/199 |
| 5,872,340 A | 2/1999 | Anagnos | | |
| 5,895,013 A * | 4/1999 | Towfiq | ..................... | 244/119 |
| 6,173,805 B1 * | 1/2001 | Thomasen | ............... | 181/207 |
| 6,279,679 B1 * | 8/2001 | Thomasen | ............... | 181/208 |
| 6,332,509 B1 * | 12/2001 | Nishikawa et al. | ......... | 181/207 |
| 6,373,956 B1 | 4/2002 | Varla et al. | | |
| 6,382,932 B2 * | 5/2002 | Kim | ........................... | 417/363 |
| 6,415,036 B1 | 7/2002 | Ritter et al. | | |
| 7,296,654 B1 * | 11/2007 | Berman | ..................... | 181/207 |

* cited by examiner

Primary Examiner—Edgardo San Martin

(57) ABSTRACT

A beam 14 having, at one end, a tie-point 11 screwed to reference location 12 of vibrating panel 15. At the other end of beam 14 is rubbing-point 13. Rubbing-point 13 is pushed into contact with panel 15 at contact location 17 by the flexibility of beam 14. Direct rubbing occurs between 13 and 17 during vibration. But a friction linkage 18 (FIG. 1B) can be mounted between beam point 13 and panel location 17 to redirect rubbing direction and/or to amplify friction movement. Vibration of panel 15 will cause slippage (rubbing) between point 13 and location 17, therefore creating friction dissipation of vibration energy. Construction of beam 14 can be complex to include more rubbing-points (FIG. 2, 3, 4) or more rubbing pieces (FIG. 1A, 1C) that can rub with each other to create more friction dissipation.

12 Claims, 2 Drawing Sheets

METHODS AND APPARATUS FOR CONTROLLING VIBRATION OF ENCLOSURES, PARTICULARLY LOUDSPEAKER ENCLOSURES

FIELD OF INVENTION

This invention relates to methods and apparatus for damping vibration of enclosures. Particular applications include enclosures of loudspeakers. Enclosure parts include: panels, frames, walls, plates, and other.

CROSS-REFERENCE TO RELATED APPLICATION

"Not applicable"

STATEMENT REGARDING FEDERALLY SPONSORED RESEARCH OR DEVELOPMENT

"Not applicable"

REFERENCE TO A MICROFICHE APPENDIX
"Not applicable"

BACKGROUND OF THE INVENTION

Vibration of an enclosure can produce annoying sound. The damping of enclosure vibration is therefore desirable and should be done when possible.

Particularly, vibration of loudspeaker enclosures can spoil the accuracy of sound reproduction.

Previous attempts to control vibration of enclosures include mass loading, cushion, padding, foam, glue, rubbery parts, and stiffening brackets. They work to some extend, but more should be done.

The present invention offers direct friction between a vibrating panel and a beam as a method of dampening that should bring vibration control to another level of effectiveness.

OBJECT AND ADVANTAGE

One of the most annoying aspects of loudspeaker sound is the parasitic sound produced by vibration of enclosures (such as harmonics, resonance). Any contribution to the control of vibration will improve loudspeaker accuracy.

It is a primary object of this invention, therefore, to provide friction as a method for additional and more effective control of loudspeaker vibration, in the pursuit of accurate reproduction of sound.

BRIEF SUMMARY OF THE INVENTION

In accordance with the present invention, a method for controlling vibration of a panel (15) comprises a sensing beam (14) of sufficient rigidity having a tie-point (11) and a rubbing-point (13). The tie-point is secured (such as using a screw 16) to a first location (called the reference location (12)) of the panel. The rubbing-point 13 is pushing (such as by the flexibility of the beam or by spring action) either directly or by a linkage (18) against a second location (called the contact location (17)) of the panel.

One intuitive explanation of how the present invention works is described below.

Vibration imparts different motion at different locations of the panel. Since the sensing beam is in contact with the panel at two locations, the differential motion at these two locations produces rubbing motion between the beam and the panel. This rubbing creates friction that dissipates vibration energy.

Since the friction between sensing beam and panel is created by relative motion, the tie-point of the beam can be on the panel or outside of the panel. Also the roles of the tie-point and of the rubbing-point can be reversed interchangeably. For example the rubbing-point can be in friction with a contact location outside of the panel and the tie-point can be tied to a reference location on the panel or vice versa.

However, the preferred embodiment of this invention relates to applications where the reference location and the contact location are on a same vibrating panel.

Figure 1:
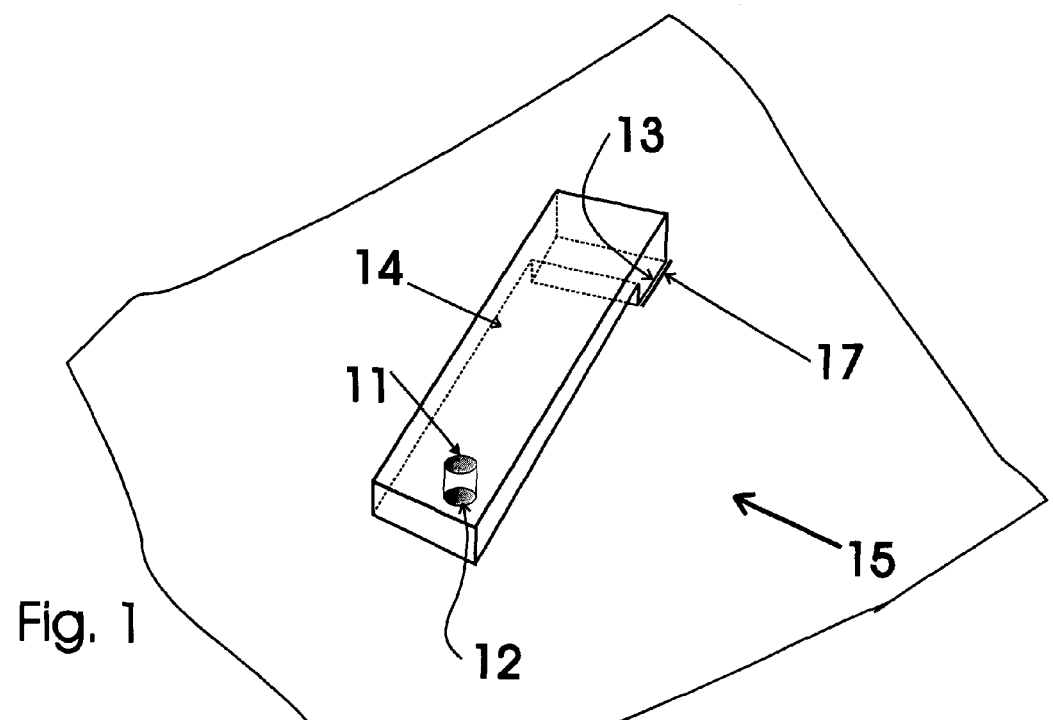
FIG. 1 shows a perspective view of an apparatus (beam 14) mounted on a vibrating surface (panel 15) of an enclosure. Friction is done directly between point 13 of the beam and location 17 of the panel, essentially horizontally. Note that horizontally means direct friction, direct friction substantially in the plane of the panel.

REFERENCE NUMERALS AND LETTERS IN DRAWINGS 11, tie-point
110, more tie-points
12, reference location secured to tie-point 11, using screw 16
13, rubbing-point
130, 131, 132, 133, 134, 135, 136, more rubbing-points
14, sensing means, sensing beam, beam, body
141, 142, added beam layers, in horizontal beam layers or in vertical beam pieces
15, enclosure, vibrating surface, panel, wall, plate
16, screw, bolt or means to secure tie-point 11 to reference location 12
17, contact location (in contact with rubbing-point 13), friction surface
18, linkage used for changing direction of rubbing motion (from horizontal to vertical or to other directions). Linkage 18 can be screwed to contact location 17 or secured by other means.
180, 181, more linkages for vertical friction

DETAILED DESCRIPTION OF THE INVENTION

The working of the present invention is intuitively explained by the differential motion that exists between two locations (12, 17) of a vibrating system 15. A body 14 can span and pushes (either directly or using linkage 18) against said two locations for creating friction that dissipates vibration energy, as discussed below:

When two points (11, 13) on a relatively rigid body 14 (called sensing beam 14) are pushing on said two locations (12, 17) of the vibrating system 15, the contacts will slip by virtue of the difference in motion of the sensing beam and of the vibrating system. The contact slippage creates friction dissipation of vibration energy.

More clearly, let:

Dv be the distance between said two locations on the vibrating system 15 (now called reference location 12 and contact location 17), and Db, the distance between said two points on the sensing beam 14 (now called the tie-point 11 and the rubbing point 13).

Dv changes during vibration, so does Db. But if the rigidity of the sensing beam is different from the rigidity of the vibrating system (including linkage 18, if needed), the change of Db will not be the same as that of Dv. Now, if point 11 of the sensing beam is secured to location 12 of the vibrating system, then the contact between point 13 and location 17 will slip because Dv is not equal to Db during vibration. Db equals Dv only at rest.

Another factor is that the direction of motion of the rubbing-point 13 of the sensing beam can differ from the direction of motion of the contact location 17 on the panel. These different directions of motion can be enhanced by using linkage 18 that may create more friction dissipation of vibration energy but at the expense of more complexity.

Now that the relative motion of the vibrating system (motion between locations 12 and 17) has been transferred to the sensing beam, more friction dissipation can also be performed by adding to the sensing beam composite structures (or layers or pieces) that can rub against each other. One such structure (141 or 142) is linked to 11 and the other (can be a simple friction pad) linked to 13 of beam 14. The linkage between said structures is designed for friction. In FIG. 1A, the piece linking to 11 is long layer 141 (or 142). Here, friction occurs between layers 141/142, and 142/14. In FIG. 1C, the piece linking to 11 is long piece 141 (or 142). Here 14 can simply have friction pads at 13 for friction between 141/14 and 14/142.

The working dimension Db (Dv) is system dependent. Given a vibrating system, Db must be large enough and depending on the design (shape, geometry, material) of the sensing beam, Db can achieve certain damping criteria. If maximum dissipation of vibrating energy is desired, more sensing beams of optimum Db can be used. For best results and lower costs, multiple rubbing-points on one sensing beam (having only one tie-point) may be preferable, see FIGS. 2, 3 & 4.

Description—FIG. 1, FIG. 1A, FIG. 1B, FIG. 1C

Figure 1A:
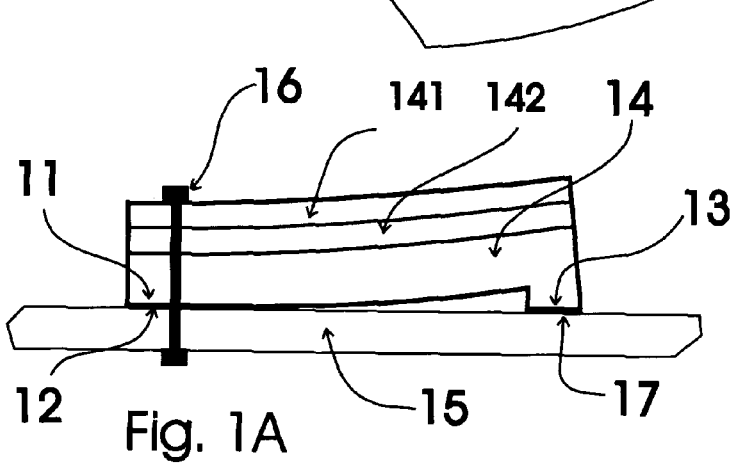
FIG. 1A shows a longitudinal cross-section view of another embodiment of FIG. 1, with added beams layers 141, 142 for more horizontal rubbing effect between the layers.
Figure 1C:
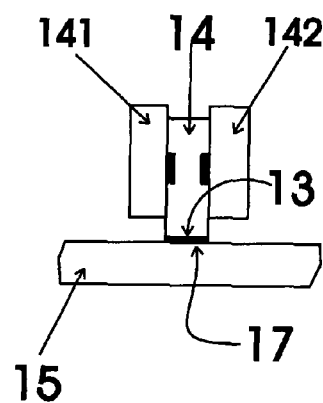
FIG. 1C shows yet another embodiment of FIG. 1, having more rubbing between vertical pieces 141/14 and 14/142. That is, friction is created when point 13 of beam 14 moves up and down while pieces 141 and 142 are stationary (because they are tied to reference location 12).

FIG. 1 shows the basic embodiment of an apparatus for damping vibration of a panel (panel belonging to an enclosure).

FIG. 1 comprises a sensing beam 14 having tie-point 11 secured to reference location 12 of the vibrating panel 15. Means for securing 11 to 12 is not shown. Rubbing-point 13 is in friction contact with panel 15 at the contact location 17. Either 13 and !7 can be a friction pad or surface.

FIG. 1A shows more details of FIG. 1. Since 11 and 12 are tied together by screw 16, relatively speaking, 11 and 12 can be considered motionless. Location 12 is now the reference for all motion. The contact location 17 vibrates with respect to 12 in a complex three dimensional pattern. Consequently, the rubbing-point 13 of sensing beam also moves relatively with respect to 12 in a complex three dimensional pattern that includes an up-down arc. Since motion of 13 differs from motion of 17, slippage will occur between 13 and 17, therefore friction dissipation of vibration energy.

The difference in motion of point 13 from the motion of location 17 comes from the difference in deformation characteristics of the linkage from 12 to 13 via beam 14 and of the linkage from 12 to 17 via panel 15. Given the same contact force applied between 15 and 14 different rigidity produces different deformation.

To increase friction dissipation, locations 12 and 17 must be chosen appropriately for large differential amplitudes of vibration. Pressure force applied from 13 toward 17 should be large to insure continuous contact and friction pads should be hard and coefficient should be small in order to allow the smallest slippage to occur. Possibly a rolling friction type of contact between 13 and 17 is effective.

FIG. 1A also shows that beam 14 can be constructed with single piece or multiple pieces, (or layers) such as the added horizontal layers 141, 142. These 3 horizontal layers can be flexible enough to rub against each other when rubbing-point 13 moves up and down, such that more friction dissipation can occur, adding to the friction at friction surface 17.

Figure 1B:
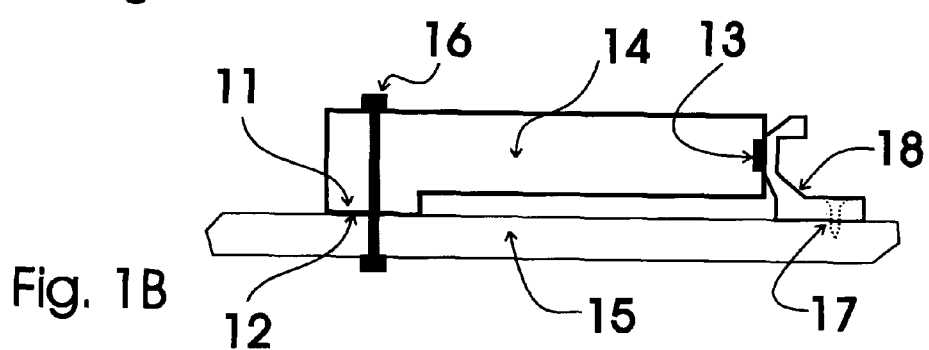
FIG. 1B shows another embodiment of FIG. 1 where friction (13 on 18) is done essentially vertically using the intermediary of linkage 18. Vertically means direction other than horizontally, can be substantially 90 degrees from horizontal.

FIG. 1B shows a linkage 18 attached to location 17. Linkage 18 has the purpose of changing the rubbing direction of point 13, from essentially horizontal to essentially vertical (or at some other angle). This change of rubbing direction may increase friction dissipation but may not worth the complexity. Experimentation is needed to decide the cost effectiveness of linkage 18. Same experimentation is true to evaluate the merit of adding 141, 142 in FIG. 1B and FIG. 1C.

FIG. 1C shows another construction of beam 14 (14 can either be constructed as a single piece, or with added pieces 141, 142). These 3 vertical pieces can be designed to rub between themselves. When piece 14 moves up and down, it rubs against pieces 141 and 142 such that more friction dissipation can occur, adding to the friction at friction surface 17. Pieces 141, 142 are very rigid and are tied to tie-point 11 in order to have more relative motion with respect to point 13 (relative motion that creates friction of 141, 142 with 14 at friction pads attached to 14 and facing 141 or 142).

It should be noted that pieces 14, 141,142 are relative pieces in the sense that they can be considered belonging to beam 14 or belonging to separated friction devices (apart from friction surface 17). In FIG. 1A, layer 14 can be considered beam 14 and layers 141, 142 can be considered separated friction devices. In FIG. 1B, piece 14 can be considered beam 14 and pieces 141, 142 can be considered separated friction devices.

Figure 2:
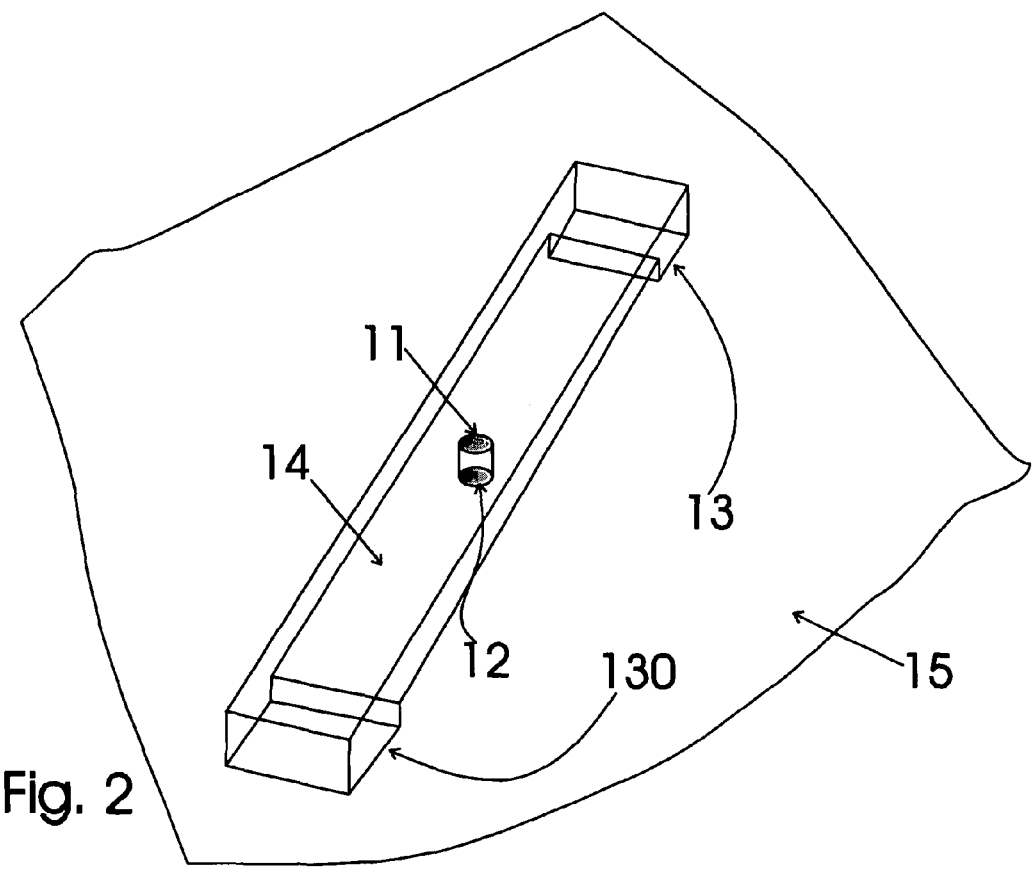
FIG. 2 shows a perspective view of another embodiment of the apparatus, having two rubbing-points (13, 130) and one tie-point 11
Figures 3, 4:
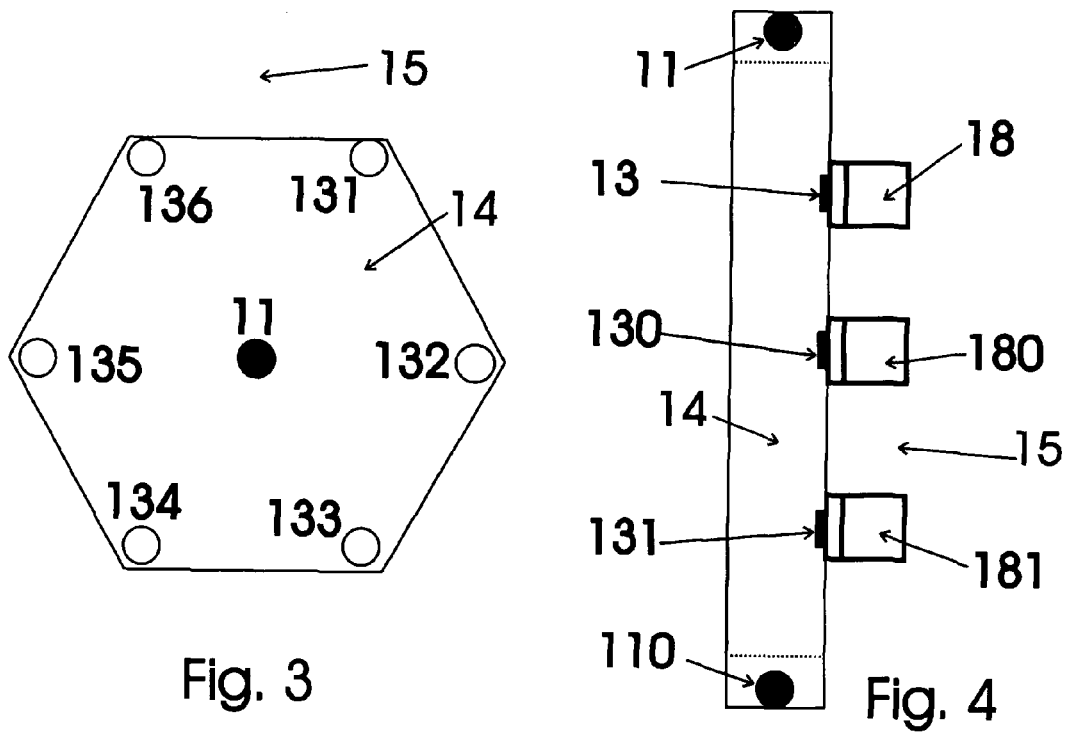
FIG. 3 shows a schematic of still another embodiment of the apparatus, having multiple (six) rubbing-points (131 to 136) and one tie-point 11.
FIG. 4 shows yet another embodiment using beam 14 having two tie-points 11, 110 and multiple vertical rubbing-points 13, 130, 131. The rubbing-points are in vertical friction with linkages 18, 180, 181. The linkages are secured to panel 15

Description—FIG. 2, FIG. 3, FIG. 4

In the implementation of the present invention, multiple contact locations on panel 15 can increase dissipation of vibration energy. Therefore a sensing beam should be designed to have multiple rubbing points, as shown in FIGS. 2, 3 and 4.

FIG. 2 shows a beam having two rubbing points 13 and 130 and a tie-point 11 in between.

FIG. 3 shows another embodiment for multiple (six) rubbing-points 131 to 136 and one tie-point 11 in centre.

FIG. 4 shows another embodiment having two tie-points 11, 110 supporting beam 14 above panel 15. Multiple friction-linkages 18, 180, 181 (secured to 15) are in vertical friction with friction-pads 13, 130, 131 mounted on beam 14.

CONCLUSION

As discussed above, the object of the present invention is to use the differential motion between two locations (12 and 17) on a vibrating enclosure (panel 15) to create friction dissipation between the enclosure and a body (beam 14) pressed against the enclosure.

Although the above description contains specificities, these should not be construed as limiting the scope of the invention but as merely providing illustrations of some of the presently preferred embodiments of this invention. For example:

The design (shape, form, dimension, composite pieces, composite structure, materials) of the sensing beam (14) and/or of the friction surface (17) can vary substantially to suit particular application for better friction dissipation and cost savings.

Preferred friction means is direct friction between the rubbing-point 13 of the beam and the contact point 17 of the enclosure. But many other friction devices can be used. They work by linking eventually to the differential motion between locations 12 and 17. Such as layers 141, 142 shown in FIG. 1A flex and rub. Pieces 141, 142 in FIG. 1B stay still with respect to 12 while 14 flexes up and down with respect to 12, to create friction between 141/14 and 14/142

Linkage 18 in FIG. 1B can be used for vertical rubbing. Linkage 18 can also be designed with motion amplifying effect using lever systems for more friction movement against point 13. Multiple linkages 18, 180, 181 can be used to create friction between a beam and a plate as shown in FIG. 4

The tie-point (11) of the beam (14) can be tied to the panel (12 of 15) using better means than a screw (16) to allow more pressure of the rubbing point (13) against the contact-point (17) and/or more relative motion between them. The tie between 11 and 12 is preferably rock solid but some relative motion between 11 and 12 may be allowed.

Beam (14) should be an added part to the speaker enclosure solely for vibration control purposes but it can also be an integral part of the speaker enclosure itself, such as the frame of the enclosure can be designed to rub against the panels of the enclosure for more vibration control.

I claim:

1. A method for controlling vibration of a vibrating system comprising:
    a. providing a flexible sensing means having at least a rubbing-point and at least a tie-point,
    b. providing at least a tying means,
    c. mounting the rubbing-point on the vibrating system, at an appropriate contact location,
    d. mounting the tie-point on the vibrating system, at an appropriate reference location, and
    e. using the tying means for securing the tie-point to the vibrating system, at the reference location, and for pushing with a sufficient force the rubbing-point into direct slippage friction with the vibrating system, at the contact location,
    whereby vibration of the vibrating system will be controlled by friction dissipation created by said pushing and by the relative motion between the tie-point and the contact location.

2. The method of claim 1 further includes a friction linkage between the contact location and the rubbing-point.

3. The method of claim 1 wherein the vibrating system is a loudspeaker enclosure.

4. A method for controlling vibration of an enclosure comprising:
    a. providing a flexible sensing means having at least two rubbing-points and at least a tie-point,
    b. providing at least a tying means,
    c. mounting the rubbing-points on the enclosure, at two appropriate contact locations,
    d. mounting the tie-point on the enclosure, at an appropriate reference location, and
    e. using the tying means for securing the tie-point to the enclosure, at the reference location, and for pushing with a sufficient force the rubbing-points into direct slippage friction with the enclosure, at said contact locations,
    whereby vibration of the enclosure will be controlled by friction dissipation created by said pushing and by the relative motion between the tie-point and the contact locations.

5. The method of claim 4 further includes a friction linkage between a contact location and a rubbing-point.

6. The method of claim 4 wherein the enclosure is a loudspeaker enclosure.

7. An apparatus for controlling vibration of an enclosure comprising:
    a. a flexible sensing beam having at least two rubbing-points and at least a tie-point mounted on the enclosure, at respectively two appropriate contact locations and an appropriate reference location, and
    b. at least a tying means for securing the tie-point to the enclosure, at the reference location, and for pushing with a sufficient force the rubbing-points into direct slippage friction with the enclosure, at the contact locations,
    whereby vibration of the enclosure will be controlled by friction dissipation created by said pushing and by the relative motion between the tie-point and the contact locations.

8. The apparatus of claim 7 further includes a friction linkage between a contact location and a rubbing-point.

9. The apparatus of claim 7 wherein the enclosure is a loudspeaker enclosure.

10. The apparatus of claim 7 wherein the enclosure is a combination of a loudspeaker enclosure on a stand.

11. The apparatus of claim 8 wherein the enclosure is a loudspeaker enclosure.

12. The apparatus of claim 8 wherein the enclosure is a combination of a loudspeaker enclosure on a stand.

* * * * *